(12) United States Patent
Reed

(10) Patent No.: US 9,133,731 B2
(45) Date of Patent: Sep. 15, 2015

(54) JOINT ASSEMBLY

(75) Inventor: Julian M. Reed, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 13/368,712

(22) Filed: Feb. 8, 2012

(65) Prior Publication Data
US 2012/0219358 A1 Aug. 30, 2012

(30) Foreign Application Priority Data
Feb. 25, 2011 (GB) .................................. 1103245.5

(51) Int. Cl.
*F16D 1/033* (2006.01)
*F01D 25/24* (2006.01)

(52) U.S. Cl.
CPC .......... *F01D 25/243* (2013.01); *F05D 2260/38* (2013.01); *Y10T 403/645* (2015.01)

(58) Field of Classification Search
CPC ...... F16B 31/02; F16B 31/021; F16B 31/028; F16B 5/0241; F16B 5/0266; F16B 5/0258; F16B 39/24; F16B 39/26; F01D 25/243; F05D 2260/38; F05B 2260/301; F05B 2260/3011; F16L 23/036
USPC ................. 403/274, 278, 279, 280, 281, 282, 403/335–337, 374.1–374.4; 411/9–11, 544; 292/307 R, 327, 256, 256.5, 256.67, 292/256.71, 256.73; 285/368, 412
See application file for complete search history.

(56) References Cited

U.S. PATENT DOCUMENTS

| | | | | |
|---|---|---|---|---|
| 1,504,511 A * | 8/1924 | Ross | ............................. | 411/159 |
| 2,125,878 A * | 8/1938 | Beasley | ........................ | 411/159 |
| 2,476,561 A * | 7/1949 | Pedersen | ......................... | 411/11 |
| 2,659,954 A * | 11/1953 | Woolsey | ......................... | 24/279 |
| 2,765,834 A * | 10/1956 | Poupitch | ...................... | 411/134 |
| 2,766,799 A * | 10/1956 | Poupitch | ...................... | 411/134 |
| 2,923,340 A * | 2/1960 | Williams | ...................... | 411/133 |
| 2,936,805 A * | 5/1960 | Rice | .............................. | 411/135 |
| 3,009,722 A * | 11/1961 | Augustin | ..................... | 411/542 |

(Continued)

FOREIGN PATENT DOCUMENTS

| GB | 806621 | 12/1958 |
|---|---|---|
| GB | 1156629 | 7/1969 |
| JP | A-2002-054773 | 2/2002 |

OTHER PUBLICATIONS

Search Report issued in British Application No. 1103245.5 dated May 31, 2011.

*Primary Examiner* — Daniel P Stodola
*Assistant Examiner* — Matthieu Setliff
(74) *Attorney, Agent, or Firm* — Oliff PLC

(57) ABSTRACT

A joint assembly for securing flanges of two casings comprising a plurality of bolts, a plurality of collars and a plurality of nuts. Each bolt extends through an aperture in the first flange and an aperture in the second flange, each collar being arranged around a shank of a respective bolt and each nut being secured on a respective one of the bolts. Each collar being arranged between one of the flanges and a nut or a head of a bolt. Each collar comprises a first member and a second member, the second member being arranged at a first end of the first member. The second member being substantially U-shaped in cross-section, the second member having first and second radially inner ends and a radially outer mid portion and an axial space is defined between the first radially inner end and the second radially inner end of the second member.

22 Claims, 4 Drawing Sheets

(56) References Cited

U.S. PATENT DOCUMENTS

| | | | | |
|---|---|---|---|---|
| 3,236,143 A * | 2/1966 | Wing | | 411/34 |
| 3,255,559 A * | 6/1966 | Gaeth et al. | | 52/232 |
| 3,306,154 A * | 2/1967 | Bailey | | 411/11 |
| 3,474,701 A * | 10/1969 | Setzler | | 411/8 |
| 3,490,796 A * | 1/1970 | Smith, Jr. | | 285/412 |
| 4,072,081 A * | 2/1978 | Curtis et al. | | 411/10 |
| 4,138,198 A * | 2/1979 | Brown | | 403/247 |
| 5,088,866 A * | 2/1992 | Ischebeck et al. | | 411/10 |
| 5,191,991 A * | 3/1993 | Jackson | | 220/203.08 |
| 5,445,469 A * | 8/1995 | Huck et al. | | 403/30 |
| 6,968,702 B2 * | 11/2005 | Child et al. | | 60/798 |
| 8,240,045 B2 * | 8/2012 | Sutcu et al. | | 29/889.22 |
| 8,281,603 B2 * | 10/2012 | Johnson | | 60/799 |
| 8,454,290 B2 * | 6/2013 | Schaser et al. | | 411/544 |
| 2005/0220564 A1 * | 10/2005 | Hinson et al. | | 411/353 |
| 2010/0011576 A1 * | 1/2010 | Sutcu et al. | | 29/889.2 |
| 2010/0129137 A1 * | 5/2010 | Heidari et al. | | 403/2 |
| 2011/0311333 A1 * | 12/2011 | Schaser et al. | | 411/378 |
| 2012/0328365 A1 * | 12/2012 | Care | | 403/337 |
| 2013/0149139 A1 * | 6/2013 | Wallace et al. | | 415/214.1 |

* cited by examiner

JOINT ASSEMBLY

BACKGROUND

The present invention relates to a joint assembly, particularly to a joint assembly for gas turbine engines and more particularly to a joint assembly for joining a gas turbine engine blade containment casing to another adjacent casing.

A fan casing and a fan intake duct of turbofan gas turbine engine are frequently joined together using nuts and bolts with the bolts arranged to pass axially through apertures in annular radially extending flanges at the abutting ends of the fan casing and the fan intake duct.

SUMMARY

If the flanges are designed to endure severe dynamic loading, it is customary to extend each bolt and provide a cylindrical collar around the shank of each bolt and between the head of the respective bolt and one of the flanges or between the respective nut and one of the flanges. This increases the effective length of the bolt and therefore the absolute axial extension of the bolt prior to failure of the bolt. It is also possible for each cylindrical collar to be crushable collar such that at extreme loads the crushable collars are crushed to allow greater parting of the flanges prior to failure of the bolts.

The general problem associated with the joint assembly between the fan casing and the fan intake duct is that during a high dynamic event the fan casing may deflect considerably and the dynamic deflection may influence the design of the fan intake duct if the dynamic deflection is transmitted through the joint assembly from the fan casing to the fan intake duct. The first problem with the conventional joint assembly is that when a crushable collar is used, the response of the joint assembly is effectively digital in that once a predetermined load is reached, the crushable collar is crushed and the flanges part to accommodate larger deflections and prevent bolt failure, but all the original clamping load provided by the bolts is lost. This may be acceptable where loads are extreme, however where loads are modest the digital effect is undesirable since it magnifies the total effect of the dynamic event. The second problem with the conventional joint assembly is that due to the need to put a significant end load on the bolts to achieve a required clamping load on the flanges, any crushing of the crushable collars occurs only after a considerable load, and therefore deflection, has been transmitted through the flanges from the fan casing to the fan intake duct or visa-versa. The third problem with the conventional joint assembly is that because flanges have a degree of flexibility in them, the load put into the collar as the flanges begin to part is usually eccentric which causes premature buckling of the collar wall. Whether the collar is crushable or not, there are occasions where the primary requirement for the joint assembly is to remain structurally effective whilst limiting the load, deflection, passed from one side of the joint assembly to the other. The conventional joint assembly using collars is not ideal.

Accordingly the present invention seeks to provide a novel joint assembly which reduces, preferably overcomes, the above mentioned problems.

Accordingly the present invention provides a joint assembly comprising a first gas turbine engine casing having a first flange and a second gas turbine engine casing having a second flange, the first and second flanges extending parallel to each other, the first flange having a plurality of first apertures extending there-through, the second flange having a plurality of second apertures extending there-through, the second apertures in the second flange being aligned with the first apertures in the first flange, a plurality of bolts and a plurality of nuts, each bolt extending through a respective first aperture in the first flange and a respective second aperture in the second flange, at least one collar, the at least one collar being arranged around a shank of one of the bolts, each nut being secured on a respective one of the bolts, the at least one collar being arranged between one of the flanges and the respective nut or between one of the flanges and a head of the respective bolt, the at least one collar comprising a first member and a second member, the second member being arranged at a first end of the first member, the first member of the collar being annular, the second member being annular and substantially U-shaped or V-shaped in cross-section, the second member having a first radially inner end, a second radially inner end and a radially outer mid portion and the second member defining an axial space between the first radially inner end and the second radially inner end of the second member.

The joint assembly may comprise a plurality of collars, each collar being arranged around a shank of a respective bolt, each collar being arranged between one of the flanges and the respective nut or between one of the flanges and a head of the respective bolt, each collar comprising a first member and a second member, the second member being arranged at a first end of the first member, the first member being annular, the second member being annular and substantially U-shaped or V-shaped in cross-section, the second member having a first radially inner end, a second radially inner end and a radially outer mid portion and the second member defining an axial space between the first radially inner end and the second radially inner end of the second member.

Each collar may comprise a third member, the third member being arranged at a second end of the first member so that the first member being arranged axially between the second member and the third member, the third member being annular and substantially U-shaped or V-shaped in cross-section, the third member having a third radially inner end, a fourth radially inner end and a second radially outer mid portion and the third member defining an axial space between the third radially inner end and the fourth radially inner end of the third member.

Each collar may comprise a third member, the third member of the collar being cylindrical, the second member of the collar being arranged axially between the first member and the third member.

The first and second members may be integral.

The first, second and third members may be integral.

The first and second radially inner ends of the second member may have the same diameter.

The first radially inner end of the second member and the first member may have the same diameter.

The second radially inner end of the second member may have a greater diameter than the first radially inner end of the second member.

The third and fourth radially inner ends of the third member may have the same diameter.

The third radially inner end of the third member and the first member may have the same diameter.

The fourth radially inner end of the third member may have a greater diameter than the third radially inner end of the third member.

The diameter of the radially outer mid portion of the second member may be the same as the diameter of the second radially outer mid portion of the third member.

The diameter of the radially outer mid portion of the second member may be greater than or less than the diameter of the second radially outer mid portion of the third member.

The first casing and the second casing may be annular. The first casing may be a fan casing and the second casing may be a fan duct intake.

The present invention provides a joint assembly comprising a first gas turbine engine casing having a first flange and a second gas turbine engine casing having a second flange, the first and second flanges extending parallel to each other, the first flange having a plurality of first apertures extending there-through, the second flange having a plurality of second apertures extending there-through, the second apertures in the second flange being aligned with the first apertures in the first flange, a plurality of bolts and a plurality of nuts, each bolt extending through a respective first aperture in the first flange and a respective second aperture in the second flange, each nut being secured on a respective one of the bolts, at least one collar, the at least one collar being arranged around a shank of one of the bolts, the at least one collar being arranged between one of the flanges and the respective nut or between one of the flanges and a head of the respective bolt, the at least one collar comprising a first member and a second member, the second member being arranged at a first end of the first member, the first member of the collar being substantially annular, the second member comprising a first portion and a second portion, the first portion having a radially inner end and a radially outer end, the first portion extending radially outwardly and axially away from the radially inner end to the radially outer end, the second portion having a radially inner end and a radially outer end, the second portion extending radially inwardly and axially away from the radially outer end to the radially inner end, the radially outer end of the first portion being secured to the radially outer end of the second portion and the first and second portions defining an axial space between the radially inner end of the first portion and the radially inner end of the second portion.

The joint assembly may comprise a plurality of collars, each collar being arranged around a shank of a respective bolt, each collar being arranged between one of the flanges and the respective nut or between one of the flanges and a head of the respective bolt, each collar comprising a first member and a second member, the second member being arranged at a first end of the first member, the first member of the collar being cylindrical, the second member comprising a first portion and a second portion, the first portion having a radially inner end and a radially outer end, the first portion extending radially outwardly and axially away from the radially inner end to the radially outer end, the second portion having a radially inner end and a radially outer end, the second portion extending radially inwardly and axially away from the radially outer end to the radially inner end, the radially outer end of the first portion being secured to the radially outer end of the second portion and the first and second portions defining an axial space between the radially inner end of the first portion and the radially inner end of the second portion.

Each collar may comprise a third member, the third member being arranged at a second end of the first member so that the first member being arranged axially between the second member and the third member, the third member comprising a third portion and a fourth portion, the third portion having a radially inner end and a radially outer end, the third portion extending radially outwardly and axially away from the radially inner end to the radially outer end, the fourth portion having a radially inner end and a radially outer end, the fourth portion extending radially inwardly and axially away from the radially outer end to the radially inner end, the radially outer end of the third portion being secured to the radially outer end of the fourth portion, the third and fourth portions defining an axial space between the radially inner end of the third portion and the radially inner end of the fourth portion.

Each collar may comprise a third member, the third member of the collar being cylindrical, the second member of the collar being arranged axially between the first member and the third member.

The first and second portions of the second member may be integral.

The radially inner end of the first portion and the radially inner end of the second portion may have the same diameter.

The radially inner end of the first portion and the first member may have the same diameter.

The radially inner end of the second portion may have a greater diameter than the radially inner end of the first portion.

The radially inner end of the third portion and the radially inner end of the fourth portion may have the same diameter.

The radially outer end of the third portion and the radially outer end of the fourth portion may have the same diameter. The radially outer end of the third portion may have a different diameter to the radially outer end of the fourth portion.

The radially inner end of the third portion and the first member may have the same diameter.

The second member may be substantially U-shaped or V-shaped in cross-section. The third member may be substantially U-shaped or V-shaped in cross-section. The second member is annular. The third member is annular. The second member is annular and substantially U-shaped or V-shaped in cross-section. The third member is annular and substantially U-shaped or V-shaped in cross-section.

BRIEF DESCRIPTION OF THE DRAWINGS

The present invention will be more fully described by way of example with reference to the accompanying drawings, in which:—

DETAILED DESCRIPTION OF EMBODIMENTS

Figure 1:
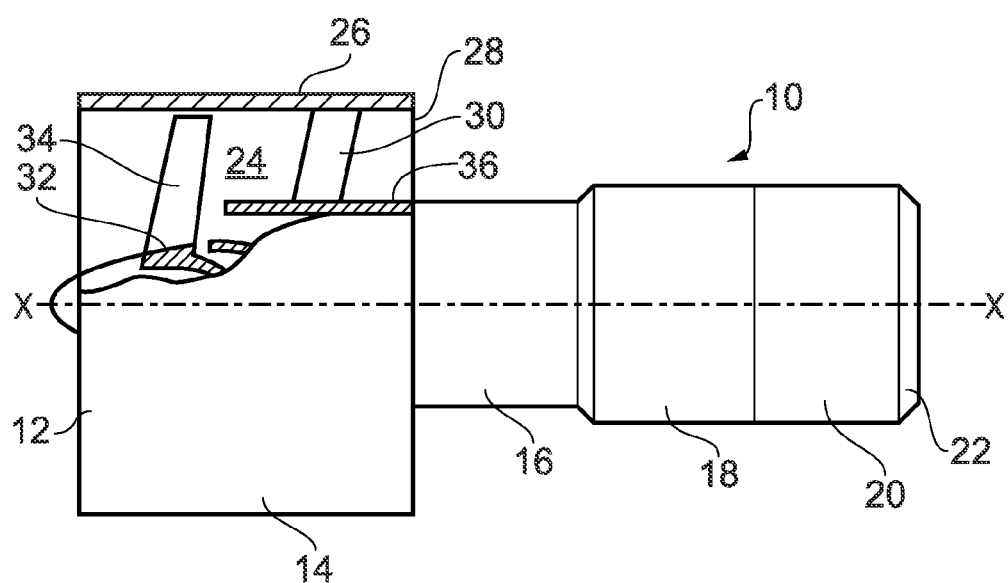
FIG. 1 is a cross-sectional view through a turbofan gas turbine engine having a joint assembly according to the present invention.

A turbofan gas turbine engine 10, as shown in FIG. 1, comprises in flow series an intake 12, a fan section 14, a compressor section 16, a combustion section 18, a turbine section 20 and an exhaust 22. The turbine section 20 comprises one or more turbines arranged to drive one or more compressors in the compressor section 16 via shafts (not shown). The turbine section 20 also comprises a turbine arranged to drive a fan in the fan section 14 via a shaft (not shown). The fan section 14 comprises a fan duct 24 defined partially by a fan casing 26. The fan duct 24 has the intake 12 at its axially upstream end and an outlet 28 at its axially downstream end. The fan casing 26 is secured to a core engine casing 36 by a plurality of radially extending fan outlet guide vanes 30. The fan casing 26 surrounds a fan rotor 32, which carries a plurality of circumferentially spaced radially extending fan blades 34. The fan rotor 32 and fan blades 34 rotate about the axis X of the gas turbine engine 10.

Figure 2:
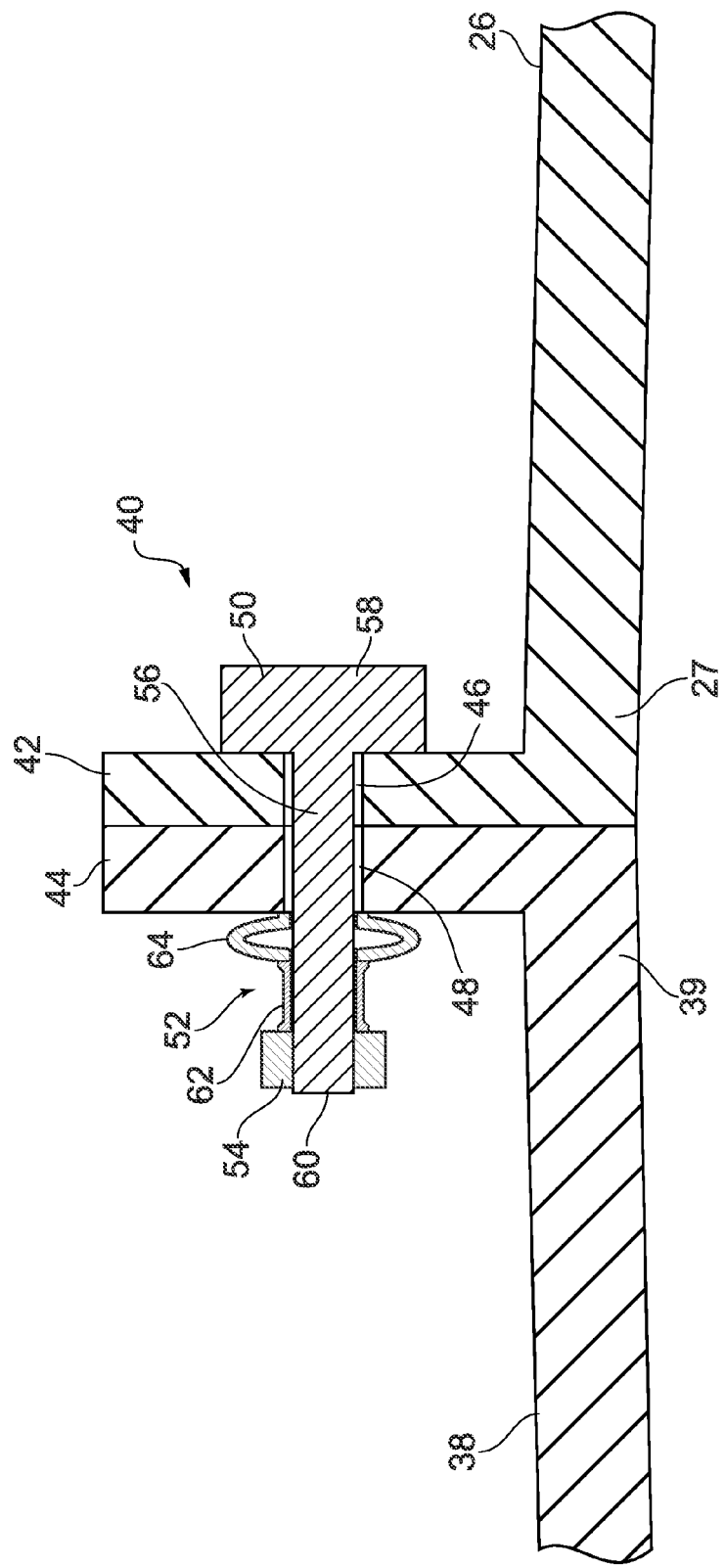
FIG. 2 is an enlarged cross-sectional view through a joint assembly between a fan casing and a fan intake duct of the turbofan gas turbine engine shown in FIG. 1.

The fan casing 26 and a fan duct intake 38 are shown more clearly in FIG. 2. The fan casing 26 comprises a cylindrical, or frustoconical, casing. The fan duct intake 38 comprises a cylindrical, or frustoconical casing. The fan casing 26 comprises a suitable metal. A joint assembly 40 is provided for securing the fan casing 26 to the fan duct intake 38. The fan casing 26 comprises a flange 42 provided at the axially upstream end 27 of the fan casing 26 and the fan duct intake 38 comprises a flange 44 provided at the axially downstream end 39 of the fan duct intake 38. The flanges 42 and 44 are substantially parallel to each other and extend radially from the fan casing 26 and fan duct intake 38 respectively. The flange 42 has a plurality of first apertures 46 extending substantially axially there-through and the flange 44 has a plurality of second apertures 48 extending substantially axially there-through. The first apertures 46 are circumferentially spaced in the flange 42 and the second apertures 48 are circumferentially spaced in the flange 44. The second apertures 48 in the flange 44 are aligned with the first apertures 46 in the flange 42. A plurality of bolts 50, a plurality of collars 52 and a plurality of nuts 54 are provided to secure the flanges 42 and 44 of the fan casing 26 and fan intake duct 38 together. Each bolt 50 extends through a respective first aperture 46 in the flange 42 and a respective second aperture 48 in the flange 44. Each bolt 50 comprises a shank 56, a head 58 and a threaded portion 60. Each collar 52 is arranged around the shank 56 of a respective bolt 50. Each nut 54 is secured, threaded, on the threaded portion 60 of a respective one of the bolts 50. Each collar 52 is arranged between one of the flanges 42, 44 and the respective nut 54 or between one of the flanges 42, 44 and a head 58 of the respective bolt 50. Alternatively each bolt 50 comprises a head 58 and a threaded portion 60 and each collar 52 is arranged around the threaded portion 60 of a respective bolt 50.

Figure 3:
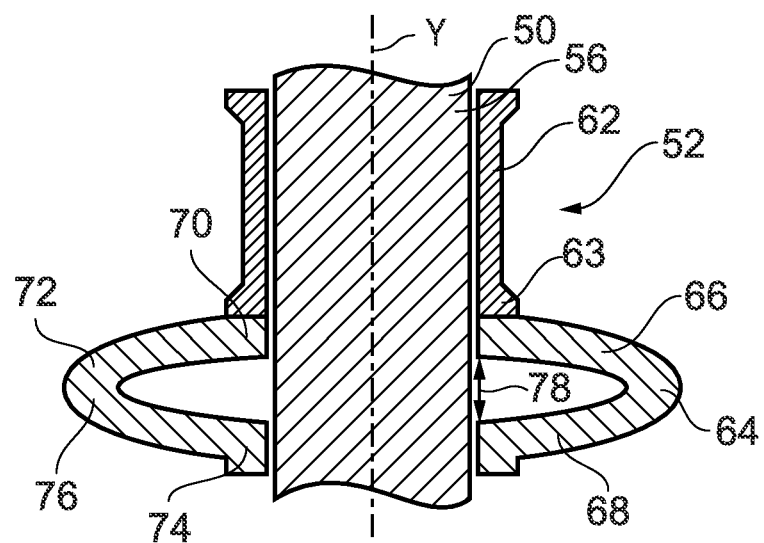
FIG. 3 is an enlarged cross-sectional view through an embodiment of a single bolt, collar and nut of a joint assembly according to the present invention.

Each collar 52 comprises a first member 62 and a second member 64, as shown more clearly in FIG. 3. The second member 64 is arranged at a first end 63 of the first member 62. The first member 62 of the collar 52 is cylindrical. The second member 64 comprises a first portion 66 and a second portion 68. The first portion 66 has a radially inner end 70 and a radially outer end 72 and the first portion 66 extends radially outwardly and axially away from the radially inner end 70 to the radially outer end 72. The second portion 68 has a radially inner end 74 and a radially outer end 76 and the second portion 68 extends radially inwardly and axially away from the radially outer end 76 to the radially inner end 74. The radially outer end 72 of the first portion 66 is secured to the radially outer end 76 of the second portion 68 and the first and second portions 66 and 68 define an axial space 78 between the radially inner end 70 of the first portion 66 and the radially inner end 76 of the second portion 68. The radially inner end 70 of the first portion 66 and the radially inner end 74 of the second portion 68 have the same internal diameter and the radially inner end 70 of the first portion 66 and the first member 62 have the same internal diameter. Thus, it is seen that the second member 64 is substantially U-shaped or V-shaped in cross-section taken in a plane through and containing the axis Y of the collar 52. The collar 52 may be crushable or non-crushable. It may be seen that the second member 64 is annular and substantially U-shaped or V-shaped in cross-section, the second member 64 has a first radially inner end 70, a second radially inner end 74 and a radially outer mid portion 72, 76 and the second member 64 defines an axial space 78 between the first radially inner end 70 and the second radially inner end 74 of the second member 64.

The radially outer end 72 of the first portion 66 and the radially outer end 76 of the second portion 68 of the second member 64 have a greater external diameter than the external diameter of the first member 62. The axial length of the first member 62 is greater than the radial thickness of the first member 62. The first radially inner end 70 of the second member 64 abuts the first end 63 of the first member 62 and the first radially inner end 70 is axially between the first end 63 of the first member 62 and the second radially inner end 74 of the second member 64.

The collar 52 of the present invention performs a dual roll of providing a linear stiffness and acting as a collar. The collar 52 of the present invention ensures that at an axial load lower than the capability of the bolt 50 and the crushing load of the collar 52 the bolt clamping load may be overcome to allow parting, separation of, the flanges 42 and 44. The parting of the flanges 42 and 44 is adjustable by adjusting the torque of the bolt 50 and the effective stiffness of the collar 52. The advantage provided by parting of the flanges 42 and 44 is that the joint assembly 40 is incapable of transmitting transverse load/deflection at the early stages of a dynamic event when the dynamic motion on the fan intake duct 38 side of the joint assembly 40 is being established and the joint assembly 40 is effectively fused. In operation as the load on the joint assembly 40 increases the axial space 78 between the radially inner end 70 of the first portion 66 and the radially inner end 74 of the second portion 68 decreases. At a predetermined load on the joint assembly 40 the axial space 78 between the radially inner end 70 of the first portion 66 and the radially inner end 74 of the second portion 68 is reduced to zero and the radially inner ends 70 and 74 of the first and second portions 66 and 68 abut each other. At this point the load in the collar 52 increases and crushing of the collar 52 occurs to allow further parting, separation of, the flanges 42 and 44 and relative movement of the flanges 42 and 44. As an example of the present joint assembly, the bolt failure load is 100% load, the collar crush load is 80% load, the initial load due to bolt torque is <=55% load and the activation load for the collar is <=55% load.

Figure 4:
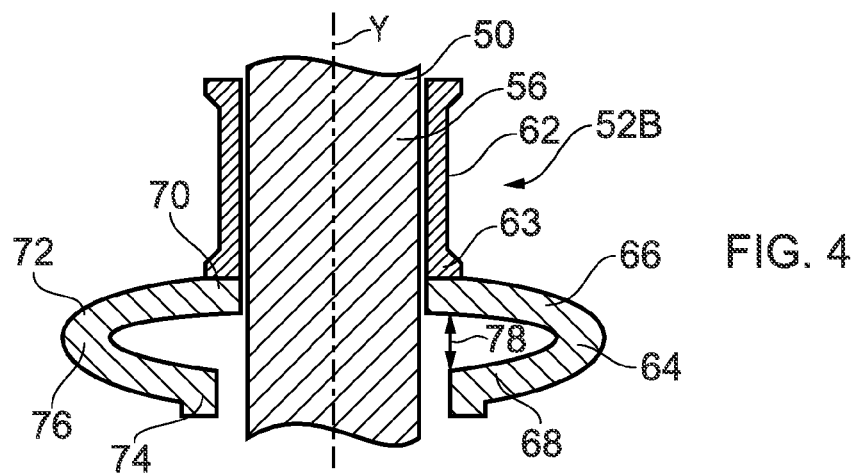
FIG. 4 is an enlarged cross-sectional view through a further embodiment of a single bolt, collar and nut of a joint assembly according to the present invention.

Another collar 52B comprises a first member 62 and a second member 64, as shown more clearly in FIG. 4. Each collar 52B is substantially the same as that shown in FIG. 3 but differs in that the radially inner end 74 of the second portion 68 has a greater internal diameter than the radially inner end 70 of the first portion 66, but as in FIG. 3 the radially inner end 70 of the first portion 66 and the first member 62 have the same internal diameter. In this arrangement of collar 52B the internal diameter is adjustable. Again, it is seen that the second member 64 is substantially U-shaped or V-shaped in cross-section taken in a plane through and containing the axis of the collar 52B. The collar 52B may be crushable or non-crushable. Again it may be seen that the second member 64 is annular and substantially U-shaped or V-shaped in cross-section, the second member 64 has a first radially inner end 70, a second radially inner end 74 and a radially outer mid portion 72, 76 and the second member 64 defines an axial space 78 between the first radially inner end 70 and the second radially inner end 74 of the second member 64.

The radially outer end 72 of the first portion 66 and the radially outer end 76 of the second portion 68 of the second member 64 have a greater external diameter than the external diameter of the first member 62. The axial length of the first member 62 is greater than the radial thickness of the first member 62. The first radially inner end 70 of the second member 64 abuts the first end 63 of the first member 62 and the first radially inner end 70 is axially between the first end 63 of the first member 62 and the second radially inner end 74 of the second member 64.

The purpose of this arrangement of collar 52B is to allow larger bolt holes in the flange either 42 or 44 contacting the collar 52B such that when the axial space 78 starts to decrease and lateral movement of one of the flanges relative to the other begins, more absolute lateral movement is possible prior to the bolt 50 contacting the side of the aperture 46 and/or 48 in the flanges 42 and/or 44. In addition the collar 52B is used to spread the flange 42, 44 contact load wider and over a greater area thus reducing the contact pressure in the flange 42, 44 directly.

Figure 5:
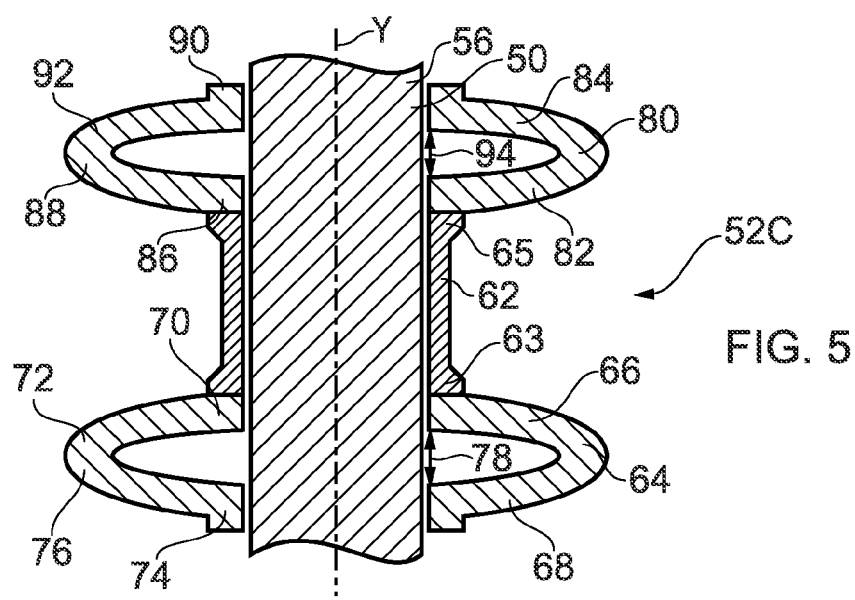
FIG. 5 is an enlarged cross-sectional view through a third embodiment of a single bolt, collar and nut of a joint assembly according to the present invention.

A further collar 52C comprises a first member 62 and a second member 64, as shown more clearly in FIG. 5. Each collar 52C is substantially the same as that shown in FIG. 3 but differs in that the each collar 52C comprises a third member 80. The third member 80 is arranged at a second end 65 of the first member 62 so that the first member 62 is arranged axially between the second member 64 and the third member 80. The third member 80 comprises a third portion 82 and a fourth portion 84. The third portion 82 has a radially inner end 86 and a radially outer end 88 and the third portion 82 extends radially outwardly and axially away from the radially inner end 86 to the radially outer end 88. The fourth portion 84 has a radially inner end 90 and a radially outer end 92 and the fourth portion 84 extends radially inwardly and axially away from the radially outer end 92 to the radially inner end 90. The radially outer end 88 of the third portion 82 is secured to the radially outer end 92 of the fourth portion 84 and the third and fourth portions 82 and 84 define an axial space 94 between the radially inner end 86 of the third portion 82 and the radially inner end 90 of the fourth portion 84. The radially inner end 70 of the first portion 66, the radially inner end 74 of the second portion 68, the radially inner end 86 of the third portion 82, the radially inner end 90 of the fourth portion 84 and the first member 62 have the same internal diameter. Thus, it is seen that the second member 64 and the third member 80 are substantially U-shaped or V-shaped in cross-section taken in a plane through and containing the axis Y of the collar 52C. The collar 52C may be crushable or non-crushable. Again, it is seen that the second member 64 is substantially U-shaped or V-shaped in cross-section taken in a plane through and containing the axis of the collar 52B. The collar 52B may be crushable or non-crushable. Again it may be seen that the second member 64 is annular and substantially U-shaped or V-shaped in cross-section, the second member 64 has a first radially inner end 70, a second radially inner end 74 and a radially outer mid portion 72, 76 and the second member 64 defines an axial space 78 between the first radially inner end 70 and the second radially inner end 74 of the second member 64. It may be seen that the third member 80 is annular and substantially U-shaped or V-shaped in cross-section, the third member 80 has a third radially inner end 86, a fourth radially inner end 90 and a radially outer mid portion 88, 92 and the third member 80 defines an axial space 94 between the third radially inner end 86 and the fourth radially inner end 90 of the third member 80.

The radially outer end 72 of the first portion 66 and the radially outer end 76 of the second portion 68 of the second member 64 have a greater external diameter than the external diameter of the first member 62. The radially outer end 88 of the third portion 82 and the radially outer end 92 of the fourth portion 84 of the third member 80 have a greater external diameter than the external diameter of the first member 62. The axial length of the first member 62 is greater than the radial thickness of the first member 62. The first radially inner end 70 of the second member 64 abuts the first end 63 of the first member 62 and the first radially inner end 70 is axially between the first end 63 of the first member 62 and the second radially inner end 74 of the second member 64. The third radially inner end 86 of the third member 80 abuts the second end 65 of the first member 62 and the third radially inner end 86 is axially between the second end 65 of the first member 62 and the fourth radially inner end 90 of the third member 80.

The purpose of this arrangement of collar 52C is to provide two areas of significantly different axial stiffness. The axial space 78 and the axial space 94 of the collar 52C are arranged to close at different axial loads, and hence at different times, during a dynamic event allowing a degree of non-linearity in the developed stiffness prior to the collar 52C taking the full load. The spring stiffness of the U-shaped or V-shaped of the collar 52C may be tuned by altering the thickness of the first portion 66 and the second portion 68 compared/relative to the thickness of the third portion 82 and the fourth portion 84 in combination with the radially outward extent/outer diameter of the radially outer ends 72 and 76 compared/relative to the radially outer extent/diameter of the radially outer ends 88 and 92. It can be seen that the thicknesses of the second member 64 and the third member 80 may be the same or different and/or the maximum diameter of the second member 64 and the third member 80 may be the same or different. A further feature of collar 52C is that the collar function is fully isolated from the effects of lateral load casing bolt bending, and therefore an eccentric load path, such that the threat of premature crushing of the collar 52C is reduced.

Figure 6:
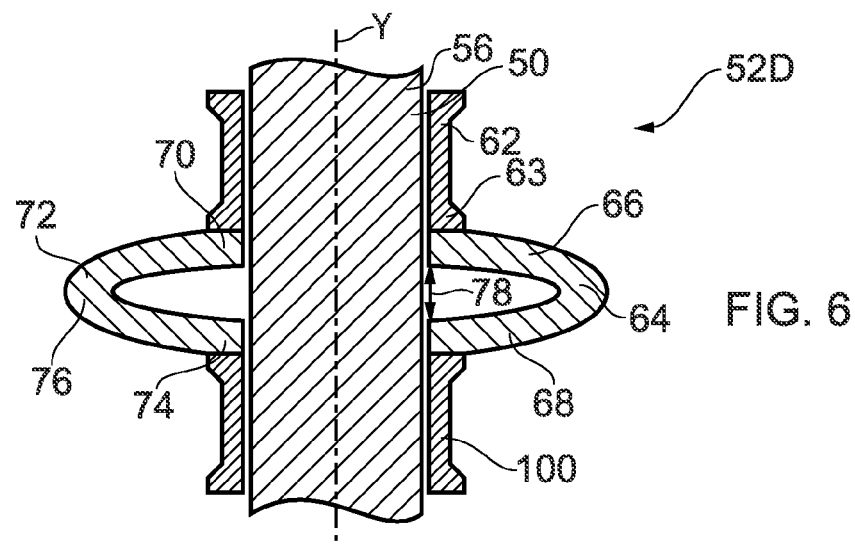
FIG. 6 is an enlarged cross-sectional view through a fourth embodiment of a single bolt, collar and nut of a joint assembly according to the present invention.

Another collar 52D comprises a first member 62 and a second member 64, as shown more clearly in FIG. 6. Each collar 52D is substantially the same as that shown in FIG. 3 but differs in that each collar 52D comprises a third member 100, the third member 100 of the collar 52D is cylindrical and the second member 64 of the collar 52D is arranged axially between the first member 62 and the third member 100. The radially inner end 70 of the first portion 66, the radially inner end 74 of the second portion 68, the first member 62 and the third member 100 have the same internal diameter. Thus, it is seen that the second member 64 is substantially U-shaped or V-shaped in cross-section taken in a plane through and containing the axis of the collar 52D. The collar 52D may be crushable or non-crushable. It may be seen that the second member 64 is annular and substantially U-shaped or V-shaped in cross-section, the second member 64 has a first radially inner end 70, a second radially inner end 74 and a radially outer mid portion 72, 76 and the second member 64 defines an axial space 78 between the first radially inner end 70 and the second radially inner end 74 of the second member 64.

The radially outer end 72 of the first portion 66 and the radially outer end 76 of the second portion 68 of the second member 64 have a greater external diameter than the external diameter of the first member 62 and the external diameter of the third member 100. The axial length of the first member 62 is greater than the radial thickness of the first member 62. The axial length of the third member 100 is greater than the radial thickness of the third member 100. The first radially inner end 70 of the second member 64 abuts the first end 63 of the first member 62 and the first radially inner end 70 is axially between the first end 63 of the first member 62 and the second radially inner end 74 of the second member 64. The second radially inner end 74 of the second member 64 abuts an end of the third member 100 and the second radially inner end 74 is axially between the end of the third member 100 and the first radially inner end 70 of the second member 64.

The purpose of this arrangement of collar 52D is to provide two areas of significantly different crushing properties, the first member 62 is arranged to crush at a first predetermined load and the third member 100 is arranged to crush at a second predetermined load or is arranged not to crush. The thicknesses of the first member 62 and the third member 100 may be different.

In each of the embodiments described above the first and second portions of the second member may be integral and/or the first and second members may be integral. In the embodiments with three members, the first, second and third members may be integral.

The fan casing and/or the intake duct may comprise a metal or a fibre reinforced composite material.

It may be possible to arrange the collars such that not all of the collars arranged at the circumferentially spaced apertures in the flanges of the casings have the same strength. A predetermined number, for example four or six, of the collars arranged at the circumferentially spaced apertures in the flanges of the casings have greater strength, are capable of much greater loading, than the remaining collars, such that if the flanges part the predetermined number of collars prevent final detachment of the flanges whilst energy is dissipated in the destruction of the remaining collars and associated bolts. It may be possible to arrange for some of the collars shown in FIG. 3 to be used with some of the collars shown in FIG. 4 and/or with some of the collars shown in FIG. 5 and/or with some of the collars shown in FIG. 6.

The advantage of the present invention is that in an extreme dynamic event, a fan blade off event, a joint assembly connecting the fan casing and the fan intake duct is allowed to separate at a lower load than before effectively preventing the two flanges from transmitting lateral displacement before the fan orbits and so protecting the fan intake duct. The crushing of the collar allows energy dissipation and movement to minimise further displacement transmission to the fan intake duct. The present invention reduces loads transmitted from the fan casing to the fan intake duct, accommodates smaller dynamic events in a recoverable manner without damage to the flanges, bolts or fan intake duct and reduces, or prevents, eccentric driving of fan intake duct during extreme dynamic events. The eccentric driving of a fan intake during extreme dynamic events occurs when a detached fan blade strikes the fan casing, or fan blade containment casing, it produces a "bump", or "bulge", at a local circumferential position in the fan casing, that is to all intents are purposes otherwise still cylindrical, or conical, as originally manufactured. This "bump" then proceeds to travel around the circumference of the fan casing at approximately the same speed as the detached fan blade as the detached fan blade goes through its collapse. The movement of the "bump" causes a series of deflections to be set up at the flange of the fan casing. These deflections of the flange of the fan casing are circumferentially local, and hence asymmetrically, or eccentrically, on the flange of the fan casing and hence the fan intake duct is also loaded asymmetrically, or eccentrically.

Although the present invention has been described with reference to a joint assembly between a fan casing and a fan duct intake for a turbofan gas turbine engine the present invention is equally applicable to a joint assembly between any gas turbine engine casings, between casings of other engines or apparatus, between annular components or generally between first and second components.

The invention claimed is:

1. A joint assembly comprising:
   a first gas turbine engine casing having a first flange and a second gas turbine engine casing having a second flange, the first and second flanges extending parallel to each other,
   the first flange having a plurality of first apertures extending there-through,
   the second flange having a plurality of second apertures extending there-through, and
   the second apertures in the second flange being aligned with the first apertures in the first flange;
   a plurality of bolts and a plurality of nuts, each bolt extending through a respective first aperture in the first flange and a respective second aperture in the second flange, and each nut being secured on a respective one of the bolts; and
   at least one collar,
      the at least one collar being arranged around a shank of one of the bolts,
      the at least one collar being arranged between one of the flanges and the respective nut or between one of the flanges and a head of the respective bolt, and
      the at least one collar comprising a first member and a second member,
      the second member being thicker than a mid portion of the first member,
      the second member being arranged at a first end of the first member,
      the first member of the collar being annular,
      the second member having a first radially inner end, a second radially inner end and a radially outer mid portion,
      the second member between the first radially inner end and the second radially inner end being a unitary monolithic annular member and being substantially U-shaped or V-shaped in cross-section,
      the second member defining an axial space between the first radially inner end and the second radially inner end of the second member, and
      the first member and the second member are structured such that, when a crushing load is applied, the first radially inner end abuts the second radially inner end before the first member is crushed.

2. A joint assembly as claimed in claim 1 comprising:
   a plurality of collars,
      each collar being arranged around a shank of a respective bolt,
      each collar being arranged between one of the flanges and the respective nut or between one of the flanges and a head of the respective bolt, and
      each collar comprising a first member and a second member,
      the second member being arranged at a first end of the first member,
      the first member being annular,
      the second member being annular and substantially U-shaped or V-shaped in cross-section,
      the second member having a first radially inner end, a second radially inner end and a radially outer mid portion, and
      the second member defining an axial space between the first radially inner end and the second radially inner end of the second member.

3. A joint assembly as claimed in claim 2 wherein each of a predetermined number of the collars has a greater strength than each of the remaining collars.

4. A joint assembly as claimed in claim 1 wherein:
each collar comprises a third member,
the third member being arranged at a second end of the first member so that the first member is arranged axially between the second member and the third member,
the third member being annular and substantially U-shaped or V-shaped in cross-section,
the third member having a third radially inner end, a fourth radially inner end and a second radially outer mid portion, and
the third member defining an axial space between the third radially inner end and the fourth radially inner end of the third member.

5. A joint assembly as claimed in claim 4 wherein the first, second and third members are formed together as a unitary monolithic annular member.

6. A joint assembly as claimed in claim 4 wherein the third and fourth radially inner ends of the third member have the same diameter.

7. A joint assembly as claimed in claim 4 wherein the third radially inner end of the third member and the first member have the same diameter.

8. A joint assembly as claimed in claim 4 wherein the fourth radially inner end of the third member has a greater diameter than the third radially inner end of the third member.

9. A joint assembly as claimed in claim 4 wherein the diameter of the radially outer mid portion of the second member is the same as the diameter of the second radially outer mid portion of the third member.

10. A joint assembly as claimed in claim 4 wherein the diameter of the radially outer mid portion of the second member is greater than or less than the diameter of the second radially outer mid portion of the third member.

11. A joint assembly as claimed in claim 1 wherein:
each collar comprises a third member,
the third member of the collar being cylindrical, and
the second member of the collar being arranged axially between the first member and the third member.

12. A joint assembly as claimed in claim 11 wherein the first, second and third members are formed together as a unitary monolithic annular member.

13. A joint assembly as claimed in claim 1 wherein the first and second members are formed together as a unitary monolithic annular member.

14. A joint assembly as claimed in claim 1 wherein the first and second radially inner ends of the second member have the same diameter.

15. A joint assembly as claimed in claim 1 wherein the second radially inner end of the second member has a greater diameter than the first radially inner end of the second member.

16. A joint assembly as claimed in claim 1 wherein the first radially inner end of the second member and the first member have the same diameter.

17. A joint assembly as claimed in claim 1 wherein the first casing and the second casing are annular.

18. A joint assembly as claimed in claim 1 wherein the first casing is a fan casing and the second casing is a fan duct intake.

19. A joint assembly as claimed in claim 1 wherein the bolt has a failure load, the collar has a crushing load of 80% of the bolt failure load, the bolt is tightened to a torque of no more than 55% of the bolt failure load and the collar has an activation load of no more than 55% of the bolt failure load.

20. A joint assembly as claimed in claim 1 wherein the radially outer mid portion of the second member has a greater external diameter than the external diameter of the first member.

21. A joint assembly comprising:
a first gas turbine engine casing having a first flange and a second gas turbine engine casing having a second flange,
the first and second flanges extending parallel to each other,
the first flange having a plurality of first apertures extending there-through,
the second flange having a plurality of second apertures extending there-through, and
the second apertures in the second flange being aligned with the first apertures in the first flange,
a plurality of bolts and a plurality of nuts, each bolt extending through a respective first aperture in the first flange and a respective second aperture in the second flange, and each nut being secured on a respective one of the bolts; and
at least one crushable collar,
the at least one collar being arranged around a shank of one of the bolts,
the at least one collar being arranged between one of the flanges and the respective nut or between one of the flanges and a head of the respective bolt, and
the at least one collar comprising a first member and a second member,
the second member being arranged at a first end of the first member,
the first member of the collar being annular,
the second member having a first radially inner end, a second radially inner end and a radially outer mid portion,
the second member between the first radially inner end and the second radially inner end being a unitary monolithic annular member and being substantially U-shaped or V-shaped in cross-section,
the second member defining an axial space between the first radially inner end and the second radially inner end of the second member, and
the second member being thicker than a mid portion of the first member,
the bolts having a failure load, the collar having a crushing load, the collar being configured such that the crushing load of the collar is less than the failure load of the associated bolt, and the bolts applying a clamping load on the first and second flanges,
the collar being configured such that if a load on the joint assembly is greater than the clamping load applied by the associated bolt and is less than the crushing load of the collar, the clamping load applied by the associated bolt is overcome by the load on the joint assembly to allow separation of the first and second flanges,
the first member and the second member being structured such that the first radially inner end abuts the second radially inner end before the first member is crushed, and
the collar being configured such that, if a load on the joint assembly is greater than the crushing load, the collar is crushed to allow further separation of the first and second flanges.

22. A joint assembly as claimed in claim 21 wherein the crushing load is 80% of the bolt failure load, the bolt applying the clamping load of no more than 55% of the bolt failure load and the clamping load is overcome by a load on the joint assembly of no more than 55% of the bolt failure load.

* * * * *